United States Patent [19]
Hyde et al.

[11] Patent Number: 5,160,556
[45] Date of Patent: Nov. 3, 1992

[54] METHOD OF HARDENING CORRUGATING ROLLS

[75] Inventors: Glenn F. Hyde, Timonium; Robert R. Ulrich, Eldersburg, both of Md.

[73] Assignee: United Container Machinery Group, Inc., Glen Arm, Md.

[21] Appl. No.: 575,928

[22] Filed: Aug. 31, 1990

Related U.S. Application Data

[63] Continuation-in-part of Ser. No. 570,936, Aug. 22, 1990.

[51] Int. Cl.$^5$ .............................................. C21D 1/09
[52] U.S. Cl. .................................. 148/525; 148/903; 219/121.6; 219/121.85
[58] Field of Search ........................ 219/121.6, 121.85; 148/147, 903, 156, 525

[56] References Cited

U.S. PATENT DOCUMENTS

| | | | |
|---|---|---|---|
| 3,848,104 | 12/1974 | Locke | 219/121.6 |
| 4,154,565 | 5/1979 | Hyde et al. | 425/369 |
| 4,250,372 | 2/1981 | Tani | 219/121.65 |
| 4,507,538 | 3/1985 | Brown et al. | 219/121.6 |

FOREIGN PATENT DOCUMENTS 63-243218 10/1988 Japan.

Primary Examiner—R. Dean
Assistant Examiner—Margery S. Phipps
Attorney, Agent, or Firm—Biebel & French

[57] ABSTRACT

A method is disclosed for heat treating the flutes of a corrugating roll. A laser having a beam with a Gaussian power density distribution is provided for heating the flutes. The beam from the laser is reconfigured by an integrator mirror to form a beam having a homogeneous power density distribution, which is subsequently interrupted by a copper rod to form a substantially U-shaped beam. The beam is positioned over an end of the roll with the open end opposing the center of the corrugating roll, and the roll is traversed relative to the beam, whereby the flute is heat treated.

16 Claims, 7 Drawing Sheets

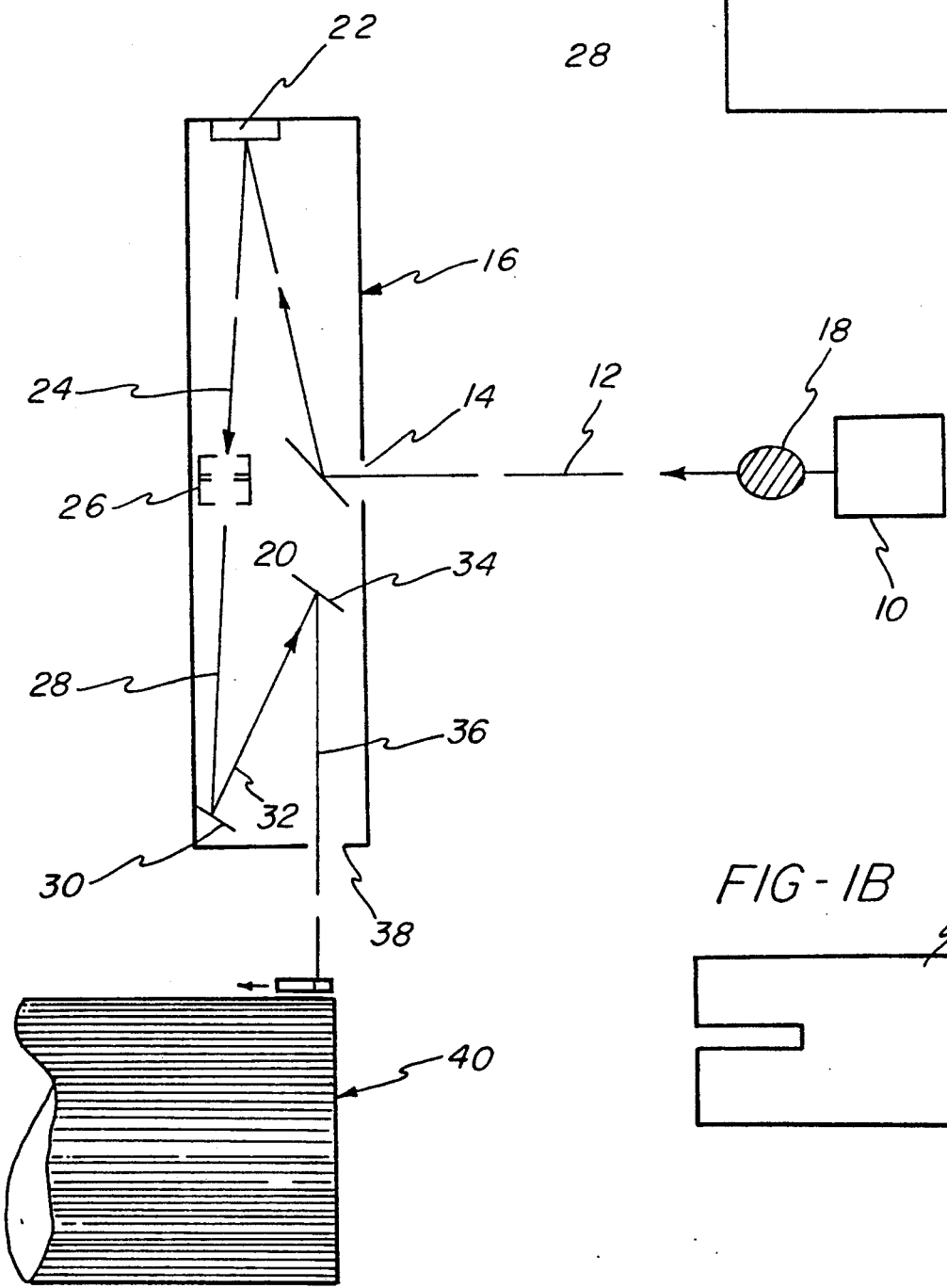
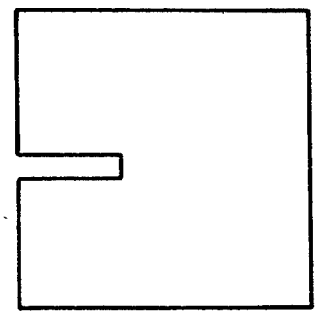
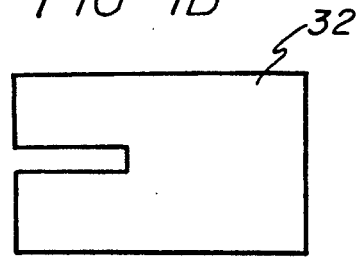

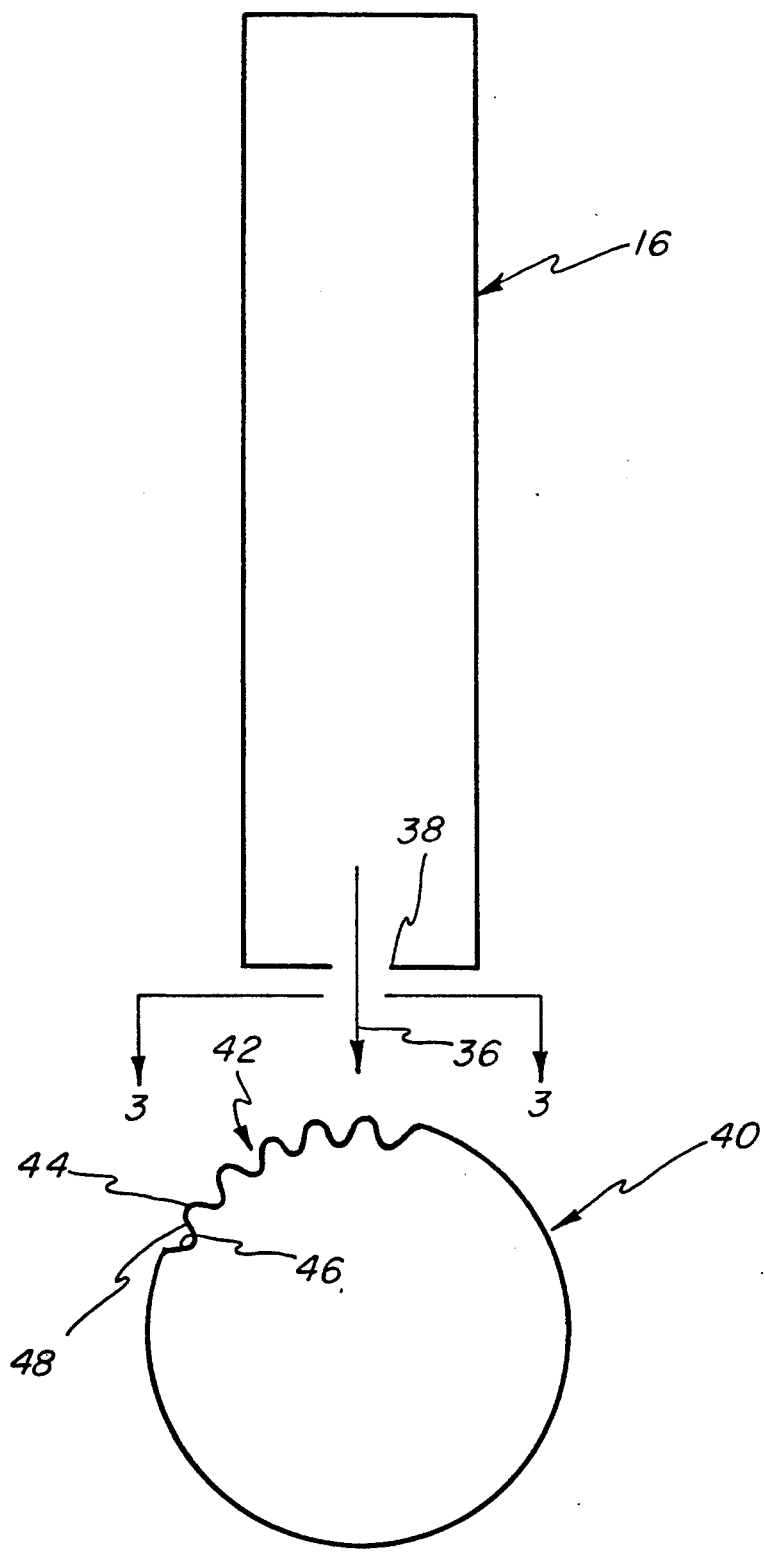

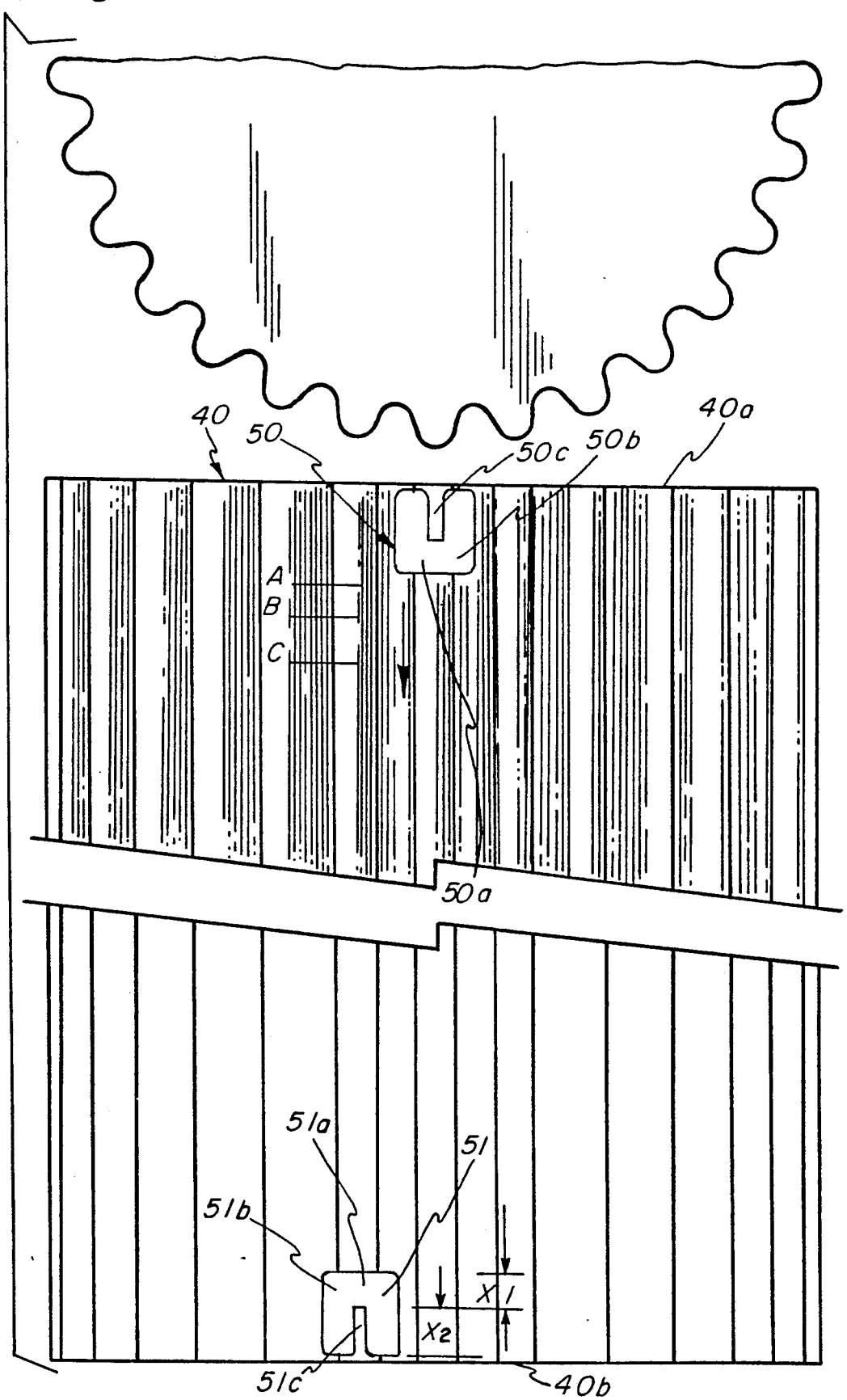

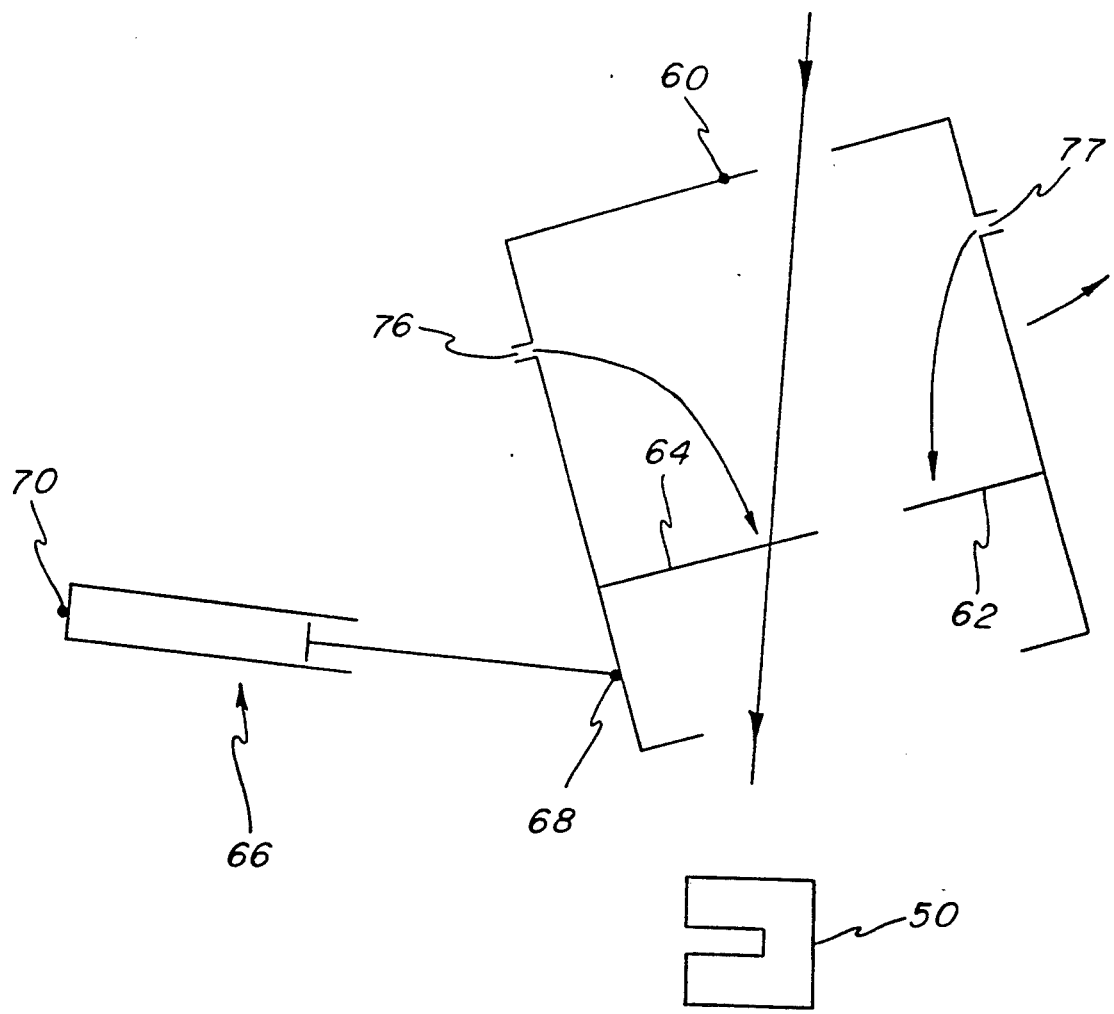

METHOD OF HARDENING CORRUGATING ROLLS

This application is a continuation-in-part of patent application Ser. No. 07/570,936 filed on Aug. 22, 1990.

BACKGROUND OF THE INVENTION

The present invention relates generally to a method of hardening corrugating rolls and more particularly to a method of heat treating the flutes of corrugating rolls using a laser.

Corrugating rolls are typically used in machinery for manufacturing corrugated paperboard. The corrugating rolls are typically formed from an alloy steel, such as AISI 4340 steel, with a diameter of 12–16 inches and a length of 87 to 110 inches, and include longitudinally extending flutes which mesh with like flutes on a like roll to form the corrugations in paper webbing passed between them. The number and size of the flutes may vary, however, corrugating rolls are typically provided with between 33 to 39 flutes per linear foot having heights ranging from 0.044 to 0.187 inch. The flutes are sinuous in profile where the peeks or crests of the sinuous profile are referred to as "flute tips", the valleys are referred to as the "roots" and the inclines or oblique surfaces between the roots and tips are referred to as the "flanks".

Due to the meshing of the paper between the two corrugating rolls, the flute tips are subject to wear as a result of sliding contact with the paper, and the flute tips must eventually be machined back to their original dimensions or the corrugating roll must be replaced with a new one. In order to diminish this problem, the corrugating rolls are provided with a hardened outer surface. Typical methods of hardening the surface of corrugating rolls include plating the outer portion of the roll with a hard outer covering such as chrome or heat treating the entire roll, or heat treating only the tips of the flutes where the major portion of the wear takes place, as is described in U.S. Pat. No. 4,154,565, issued to Hyde et al and assigned to the assignee of the present application.

U.S. Pat. No. 4,154,565 discloses heat treating the flute tips of a corrugating roll by means of either a laser or an electron beam. In the process described by the patent for heat treating the roll by using a laser, an average hardening depth of 0.031 inch was obtained. The depth to which a flute can be hardened in the process described by this patent is limited by the temperature to which the flute can be heated by the laser beam without melting the surface material of the flute which is related to the distribution of the power density through the cross section of the beam.

A typical laser emits a beam having a circular cross section with a power density which varies according to a Gaussian distribution (or a higher order power density variation) such that the power density of the beam is greatest at the center of the beam and tapers off toward the radial edges. Thus, when a Gaussian laser beam is focussed upon the flute of a roll, the extent to which the flute may be heat treated by the beam is limited by the temperature which is reached by the portion of the flute impinged upon by the center of the beam, since this portion of the flute receives the greatest amount of energy in a given time and will be subject to reaching a melting temperature before the surrounding portions of the flute.

Therefore, there is a need for a method of heat treating the flutes of a corrugating roll to the maximum possible depth using a laser beam without causing surface melting or distortion of the flutes. More recently, it has been found advantageous to heat treat the flanks and roots of the corrugating roll also, as these surfaces, too are subject to wear. However, the flanks and roots can only be heat treated to the extent allowable for the heat treating of the flute tips. Said differently, the flute tips will be overheated and will melt prior to the complete heat treating of the flanks and roots.

It has been found that the flanks and roots require greater energy, than that of the flute tips. The flanks are not quickly heated due to their oblique nature, that is, the angle of incidence of the light source reduces the heat absorption for heat treating purposes. With respect to the roots, the surrounding mass of the corrugating roll prevents the roots from quickly heating thereby limiting the heat treating effect.

It is an object of the invention to provide a method and apparatus for heat treating corrugating rolls, where the entire flutes, including the tips, roots and flanks are heat treated.

It is a further object of the invention to provide such heat treating without overheating the flute tips, and without warping or otherwise distorting the roll.

Other objects and advantages of the invention will be apparent from the following description, the accompanying drawings and the appended claims.

SUMMARY OF THE INVENTION

The present invention provides a method of heat treating the flute tips, flanks and roots of a corrugating roll without melting the surface material on the flute tips or otherwise distorting the flute.

In the preferred embodiment of the invention, a method of heat treating cylindrical corrugating rolls having a plurality of sinuous shaped flutes extending along the length thereof, where the flutes consist of roots and tips, with flanks intermediate said roots and tips, comprises the steps of providing a laser having a Gaussian or other non-uniform beam output; reconfiguring the beam from a Gaussian beam to a beam being wide enough to span one complete flute, where the beam has a uniform energy level directed at the roots and flanks, and a lesser energy level directed at the flute tips; positioning a roll to be heat treated with a flute thereof centered within the reconfigured beam and causing a relative movement between the roll and the reconfigured beam in a direction parallel to the length of the roll such that the flute is hardened.

By directing a lesser energy level at the tips, the entire flute can be heat treated without melting the flute tips.

An inventive apparatus carrying out the method set forth above comprises a $CO_2$ laser having a Gaussian or other non-uniform beam output and an integrator mirror comprising multi-faceted mirrors adapted to receive the Gaussian beam and reconfigure the beam into a beam having a uniform energy distribution. The apparatus also includes a chamber for receiving the reconfigured beam therethrough, the chamber having means for clipping an elongate segment of the reconfigured beam. The apparatus also includes means to move the reconfigured beam relative to the roll and lengthwise of the flutes, and means to direct the reconfigured beam at the flute with the shielded segment of the beam aligned with a flute tip.

BRIEF DESCRIPTION OF THE DRAWINGS

FIG. 1 is a schematic of the apparatus used to perform the method of the present invention;

FIG. 1A is a cross-sectional view of the square laser beam after reflection by the integrator mirror;

FIG. 1B is a cross-sectional view of the rectangular laser beam after reflection by the cylindrical mirror;

FIG. 2 is an end view of the apparatus shown in FIG. 1;

FIG. 3 is a view taken on lines 3—3 of FIG. 2;

FIG. 4C is a view, similar to that of FIG. 4B, where the clipper box is pivoted in the opposite direction to interrupt the light source from the opposite side;

DETAILED DESCRIPTION OF THE PREFERRED EMBODIMENT

Figure 4A:
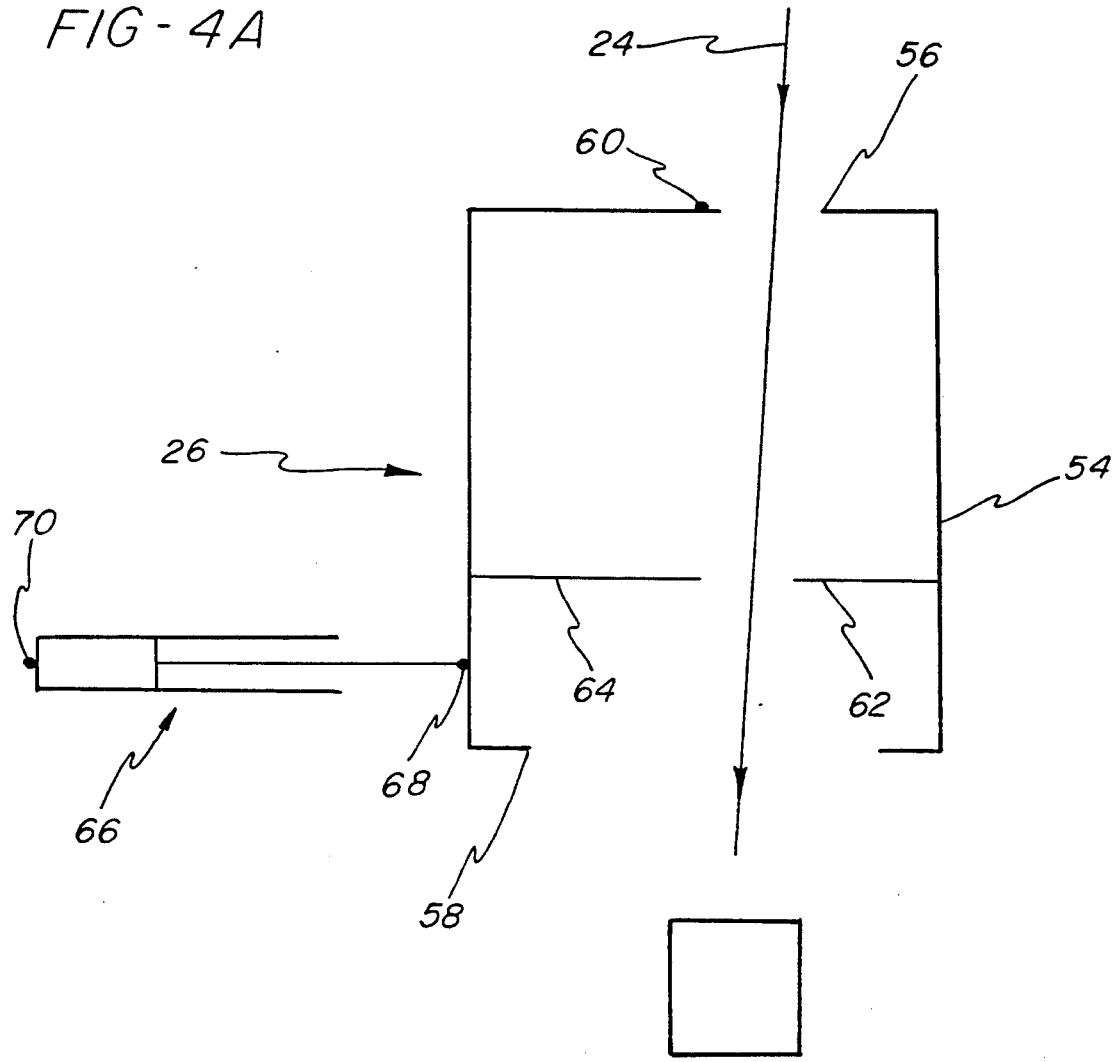
FIG. 4A is a diagrammatical view of the clipper box shown where the emitted square beam is uninterrupted.

The arrangement of the apparatus used in the present process is shown in schematic form in FIG. 1. A laser 10 having a Gaussian beam 12 (or other non-uniform beam) is directed into an opening 14 of a lens box 16. In a preferred embodiment, a $CO_2$ laser 10 is provided having a Gaussian beam output 12 with an oval-shaped cross-section, shown at 18, of $2-\frac{3}{8} \times 2-\frac{1}{8}$ inches and set to provide an output power of 2-5 kilowatts.

The Gaussian beam 12 is directed into the opening 14 and towards a first flat mirror 20, which redirects the beam 12 against an integrator mirror 22. The integrator mirror 22 is made up of a plurality of mirrors arranged in a grid, so arranged that they receive and focus the Gaussian beam 12 into a square beam of uniform density, or "top hat" beam 24.

The top hat beam 24 is directed through a clipper box 26 which interrupts the light path to shield or clip a portion of the top hat beam 24, described in greater detail hereafter. The shielded beam, shown at 28 in FIG. 1A, is thereafter directed towards a cylindrical mirror 30 which refocuses the shielded beam 28 into a rectangular beam 32 (FIG. 1B), which is in turn directed towards a spherical mirror 34. The spherical mirror 34 is concave in nature and refocuses the rectangular beam 32 into a square beam 36 (FIG. 3), approximately $\frac{3}{8}$ inch per side.

As shown in FIGS. 1 and 2, the beam 36 is directed through an opening 38 of the lens box 16, towards a corrugating roll 40 to be heat treated. As shown best in FIG. 2, the corrugating roll 40 comprises a plurality of flutes 42, where the flutes 42 are sinuous in profile, consisting of flute tips 44 and root portions 46, with oblique portions or flanks 48, intermediate each tip and root. As mentioned earlier, it is an object of the invention to not only heat treat the flute tips 44, but also the flanks 48 and roots 46, as they too wear due to the sliding friction of the paper web passed between them.

In order to heat treat the entire flute 42, the beam 36 is projected at, and laterally aligned with, a flute 42, as shown in FIG. 2. With reference now to FIG. 3, the beam 36 is shielded, via the clipper box 26, to produce a beam pattern shown at 50, where the beam 50 is substantially U-shaped, having a transverse portion 50a and longitudinal beam portions 50b. The two longitudinal beam portions 50b are separated by a shielded or clipped section 50c formed by the light interruption of the clipper box 26. As projected on the corrugating roll 40, the beam 50 is laterally centered with a flute tip 44, with the longitudinal beam portions 50b spanning the flanks 48 and roots 46 on opposite sides of one flute 42. Said differently, the beam pattern 50 spans at least one sinuous cycle of the flutes, from one root 46 to the next adjacent root 46.

With reference now to FIG. 4A, the clipper box 26 is shown diagrammatically as including a generally box-shaped member 54, having a light inlet aperture 56, and an exit aperture 58. The reconfigured beam 24 from the integrator mirror 22 is directed towards the clipper box 26, and if the clipper box is positioned as shown in FIG. 4A, the emitted beam 24 will pass through the box 26, uninterrupted, and through the aperture 38, as a square beam. However, the uninterrupted light beam shown in FIG. 4A is only theoretical, as it is not the intention of the clipper box 26 to function in that mode.

With reference still to FIG. 4A, the clipper box 26 is pivotal about point 60, and two clipper rods 62 and 64 extend inwardly from sidewalls of the clipper box 26. An air cylinder 66 is pinned to the clipper box 26 at 68, and pinned to the lens box 16 at 70, and is actuable to pivot the clipper box between the extremes shown in FIGS. 4B and 4C.

With reference again to FIG. 3, the heat treating process is begun, where the beam 36 is projected at one end of the corrugating roll. To define the beam configuration 50, the clipper box 26 is pivoted to the position shown in FIG. 4B via the air cylinder 66, and the rod 64 now interrupts the laser beam 24 to produce the beam configuration 50. The shielded section 50c of the beam is produced by the introduction of the rod 64 within the beam 24. The shielded section 50c is approximately the width of the flute tip 44, as best shown in FIG. 2.

The heat treating process is begun by moving the beam 50 relative to the corrugating roll 40, such that the relative movement between the beam 50 and the corrugating roll 40, is in the direction of the arrow in FIG. 3, towards the center of the corrugating roll 40. When the beam 50 reaches position A, the flute tips, roots and flanks corresponding to the longitudinal position at A, begin to be heated by the beam 50. When the beam 50 reaches the longitudinal position B, the flute tip corresponding to longitudinal position A is no longer heated, as the shielded or clipped portion 50c is passing thereover. The roots and flanks corresponding to position B are, however, still heated, as the longitudinal sections 50b remain directly above them, and will be until the beam 50 reaches position C. In the preferred embodiment of the invention, the beam 50 is moved from one end 40a, to the opposite end, by traversing the optical box 16 on precision tracks above, and relative to, the corrugating roll 40.

In the preferred embodiment of the invention, the beam 50 is moved at 65 inches/min., and the beam 50 is $\frac{3}{8}$ inch square. The shielded portion 50c has a dimension $X_2$ of $\frac{1}{4}$ inch, leaving the transverse section 50a with a dimension $X_1$ of $\frac{1}{8}$ inch. With a relative speed of 65 inches/min., each flute tip is heat treated for approximately 0.115 seconds, whereas the flanks and the roots are heat treated for approximately 0.345 second. When the beam reaches the end of one flute 42, the next adjacent flute 42 is heat treated, and the corrugating roll is indexed to pick up the next flute.

It is also necessary to reposition the beam configuration, such that the transverse section of the beam leads, or faces the center of the corrugating roll, as shown at 51 in FIG. 3. To reconfigure the beam, the clipper box 26 is pivoted from the position shown in FIG. 4B to the position shown in FIG. 4C, via the air cylinder 66. The beam 51 is now traversed in the opposite direction to heat treat the entire length of the next flute with the beam 51. The entire corrugating roll is heat treated by indexing the corrugating roll to position an un-heat treated flute with the beam.

Figure 4B:
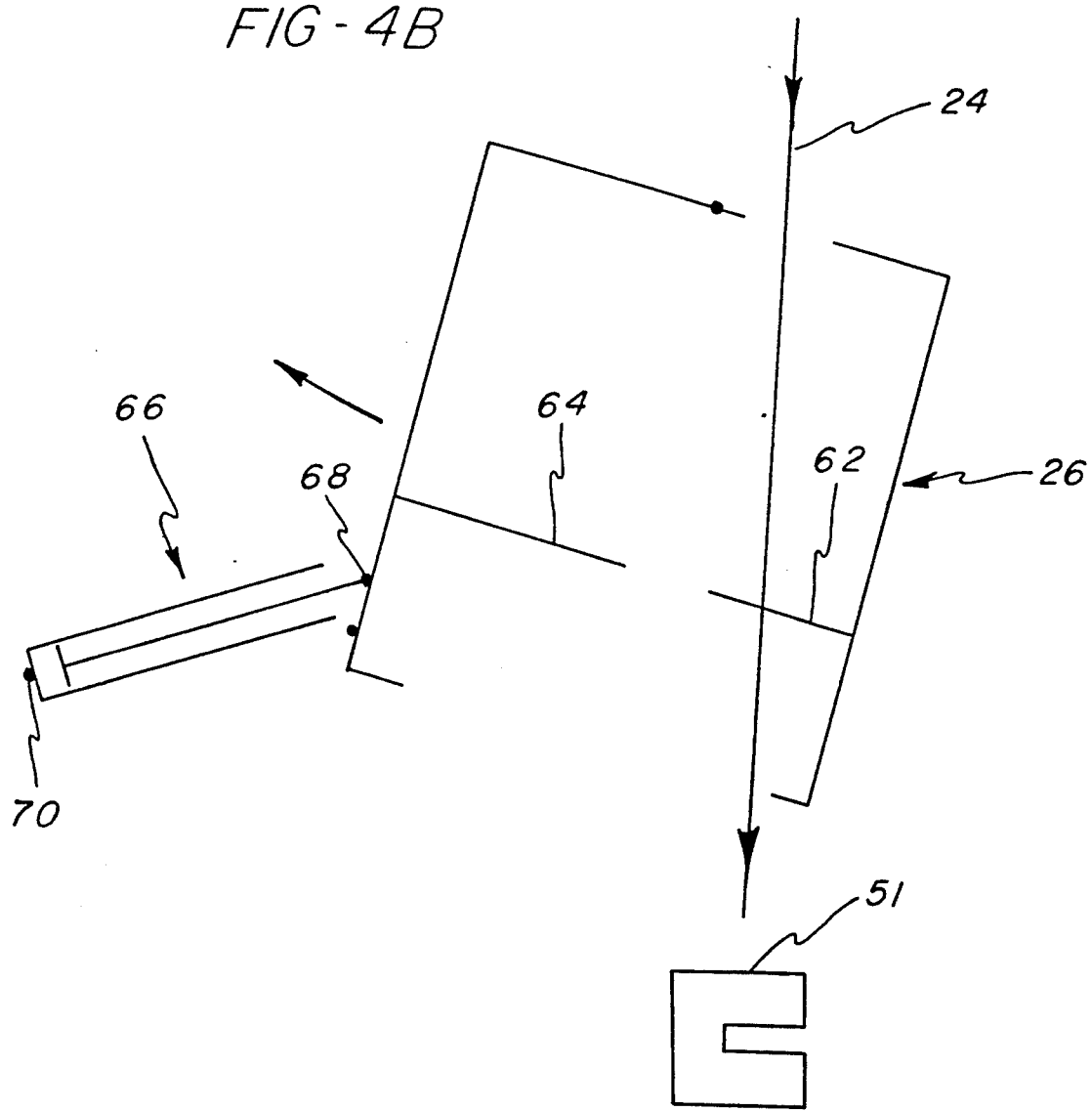
FIG. 4B is a view similar to that of FIG. 4A, where the clipper box is pivoted to interrupt the light source.
Figure 5:
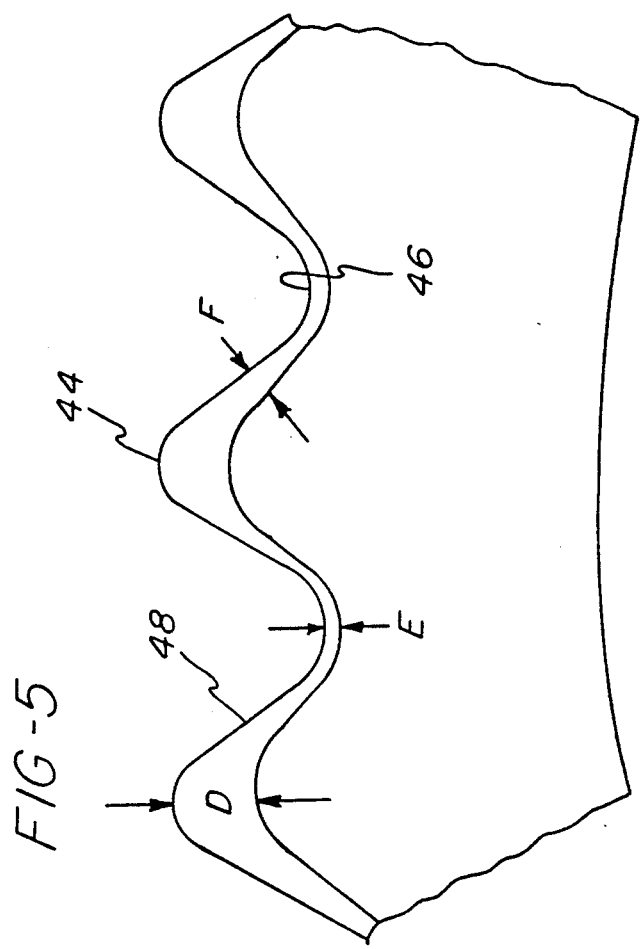
FIG. 5 is a cross-sectional view of a portion of a heat treated corrugating roll showing the degree of heat treating.
Figure 4D:
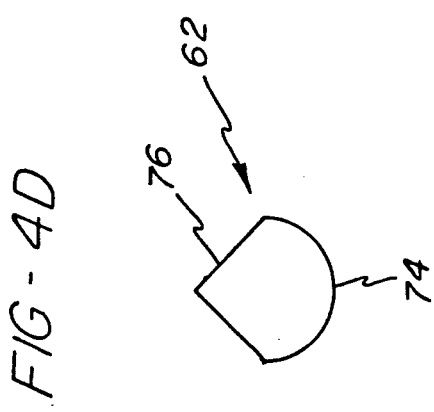
FIG. 4D is an end view of the clipper rod of the clipper box shown in FIGS. 4A-4C.

Also in the preferred embodiment, the rods 62 and 64 have a cross-sectional shape as that shown in FIG. 4D having a semi-circular lower section 74, and tapered sections 76 facing the beam. By changing the angle of incidence of the beam relative to the rods 62, 64 (via sections 76), the rods are not overheated by the beam. To further cool the rods 62, 64, the clippers 62 and 64 are impinged with a flow of helium gas through ports 76 and 77, as shown in FIG. 4B.

In preparation for the heat treating, the corrugating roll 40 is cleaned and coated with a light absorbing coating such as graphite or flat black paint and is positioned above the flute tip 44, such that a square spot ⅜ inch on each side is formed at the flute and the power density at the upper tip of the flute is approximately 35,000 W/in$^2$.

By way of example, flute tips 44 of a corrugating roll having C-flutes heat treated by the above method with a power setting of 4.4 kw may be hardened to a depth D of approximately 0.060–0.090 inches, roots 46 may be heat treated to a depth E of 0.024–0.030 inches and the flanks 48 may be heat treated to a depth F of 0.027–0.035 inches, and may be hardened to an average hardness of approximately 61–66 $R_c$. Thus, the flute tips 44 of the corrugating roll flutes 42 which are subjected to the greatest amount of abrasive forces during the corrugating process may be selectively provided with a hard surface to resist wear, but the roots and flanks may also be heat treated to a lesser degree, as they are subjected to minimal wear.

In the preferred embodiment of the invention, the corrugating roll is water cooled to prevent overheating the roll. Approximately ½ GPM flow rate through the inner diameter of the roll has been found to be sufficient. The purpose of water cooling is to keep the roll body temperature low enough that a good self quench is achieved. The roll should be kept below 90° F. to achieve proper depth of hardening and high hardness.

Advantageously, laser hardening of the steel corrugating rolls causes no decarburization at the surface of the roll. Decarburization is caused by exposing the surface to hardening temperatures above 1550° F. However, in laser hardening, the speed of heating and heat removal are so fast that it defies carbon removal. If the surface of the roll is decarburized, for example by induction, the surface of the steel has no carbon and therefore cannot achieve high hardness. If this occurs, the surface of the roll must be ground back to remove the decarburized layer and warpage due to the induction process. The grinding process itself, however, can cause surface tempering of a few thousands of an inch.

While the method and apparatus herein described constitute preferred embodiments of the invention, it is to be understood that the invention is not limited to this precise method and apparatus, and that changes may be made therein without departing from the scope of the invention, which is defined in the appended claims.

What is claimed is:

1. A method of heat treating longitudinally extending, sinuously shaped projections, said projections consisting of roots and tips, with flanks intermediate said roots and tips, comprising the steps of:

providing a laser having a Gaussian beam output;

reconfiguring said beam from a Gaussian beam to provide a reconfigured beam being wide enough to span one complete projection, where said reconfigured beam has a uniform energy level directed at said roots and flanks, and a lesser energy level directed at said tips;

centering said reconfigured beam on said projection;

heat treating said projection to a desired hardness by causing relative movement between the projection and said reconfigured beam.

2. The method of claim 1, wherein said reconfiguring step comprises first directing said Gaussian beam at an integrator mirror forming a beam having a rectangular cross-section of substantially uniform energy density, and subsequently shielding a portion of said Gaussian beam over said projection tip.

3. A method of heat treating longitudinally extending, sinuously shaped projections, said projections consisting of roots and tips, with flanks intermediate said roots and tips, comprising the steps of:

providing a laser having a Gaussian beam output;

reconfiguring said beam from a Gaussian beam to provide a reconfigured beam being wide enough to span one complete projection, where said reconfigured beam has a uniform energy level directed at said roots and flanks, and a lesser energy level directed at said tips;

centering said reconfigured beam on said projection; and heat treating said projection to a desired hardness by causing relative movement between the projection and said reconfigured beam;

said reconfiguring step comprising first directing said Gaussian beam at an integrator mirror forming a top hat beam having a rectangular cross-section of substantially uniform energy density, and subsequently shielding a portion of said Gaussian beam over said projection tip;

said beam being shielded by directing said beam through a chamber and past an elongate obstruction within said chamber.

4. The method of claim 3, wherein said elongate obstruction is a copper rod.

5. The method of claim 4, wherein said shielding step further comprises the step of cooling said rod, by impinging said rod with an inert gas.

6. The method of claim 1, wherein said proportion is hardened to an average hardness of approximately 61–66 $R_c$.

7. A method of heat treating longitudinally extending, sinuously shaped projections, said projections consisting of roots and tips, with flanks intermediate said roots and tips, comprising the steps of:

providing a laser having a Gaussian beam output;

reconfiguring said beam from a Gaussian beam to provide a reconfigured beam being wide enough to span one complete projection, where said reconfigured beam has a uniform energy level directed at said roots and flanks, and a lesser energy level directed at said tips;

centering said reconfigured beam on said projection; and heat treating said projection to a desired hardness by causing relative movement between the projection and said reconfigured beam;

said reconfiguring step comprising first directing said Gaussian beam at an integrator mirror forming a top hat beam having a rectangular cross-section of substantially uniform energy density, and subsequently shielding a portion of said Gaussian beam over said projection tip;

said reconfigured beam having a power density of approximately 35,000 W/in$^2$ at said projection tip.

8. The method of claim 1, wherein said projection is a flute on a corrugated roll, said step of heat treating said projection occurs by causing relative movement between the projection and said reconfigured beam at a rate of approximately 50-70 inches/minute.

9. A method of heat treating longitudinally extending, sinuously shaped flutes on corrugating rolls, said flutes consisting of roots and tips, with flanks intermediate said roots and tips, comprising the steps of:

providing a $CO_2$ laser having a Gaussian beam output;

reconfiguring said beam from said Gaussian beam to provide a reconfigured beam having a generally rectangular beam having a substantially uniform power density throughout its cross sectional area;

shielding a segment of said beam length intermediate side edges thereof to provide a shielded segment;

directing said reconfigured beam radially towards a single flute, with said shielded segment of said beam longitudinally aligned with a flute tip of said flute, whereby the flanks and roots of said flutes are heated for a longer duration than said tips; and heat treating said flute by causing relative movement between said beam and said corrugating roll to heat the length of each said flute.

10. The method of claim 9, wherein said reconfiguring step comprises directing said Gaussian beam at an integrator mirror.

11. The method of claim 10, wherein said shielding step comprises directing said reconfigured beam through a chamber carrying a clipper, and said clipper defines said shielded segment.

12. The method of claim 11, further comprising the step of cooling said clipper.

13. The method of claim 12, wherein said clipper is cooled by purging said chamber with an inert gas.

14. A method of heat treating longitudinally extending, sinuously shaped flutes on corrugating rolls, said flutes consisting of roots and tips, with flanks intermediate said roots and tips, comprising the steps of:

configuring a laser beam into a substantially U-shaped laser beam, where the energy density is substantially constant across the beam face;

projecting said substantially U-shaped beam at a first end of a corrugating roll with said beam being radially aligned with a flute, with longitudinal portions of said substantially U-shaped beam at least partially overlying a root and flank on opposite sides of said flute tip; and heat treating said flutes by moving said U-shaped beam longitudinally along an individual flute, from said first end to a second end.

15. The method of claim 14, wherein said projecting step comprises the step of centering said substantially U-shaped beam on a radial center of said flute; and said heat treating step comprises the step of moving said substantially U-shaped beam along said flute.

16. The method of claim 14, wherein said configuring step further comprises the step of generating said substantially U-shaped beam by interrupting a laser beam with an obstruction.

* * * * *

UNITED STATES PATENT AND TRADEMARK OFFICE
CERTIFICATE OF CORRECTION

PATENT NO. : 5,160,556

DATED : November 3, 1992

INVENTOR(S) : Glenn Francis Hyde and Robert Roy Ulrich

It is certified that error appears in the above-identified patent and that said Letters Patent is hereby corrected as shown below:

Column 6,
Claim 6, line 55, "proportion" should be --projection--.

Signed and Sealed this

Twenty-sixth Day of October, 1993

Attest:

BRUCE LEHMAN

Attesting Officer

Commissioner of Patents and Trademarks